(12) United States Patent
Maekawa (10) Patent No.: US 11,824,343 B2
(45) Date of Patent: Nov. 21, 2023

(54) OUTPUT MODULE OF INDUSTRIAL CONTROL APPARATUS

(71) Applicant: DENSO WAVE INCORPORATED, Aichi-pref. (JP)

(72) Inventor: Takaaki Maekawa, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 27 days.

(21) Appl. No.: 17/519,720

(22) Filed: Nov. 5, 2021

(65) Prior Publication Data
US 2022/0166204 A1    May 26, 2022

(30) Foreign Application Priority Data
Nov. 20, 2020   (JP) .................................. 2020-193141

(51) Int. Cl.
*H02H 1/00* (2006.01)
*H02H 3/02* (2006.01)
*H02H 3/08* (2006.01)

(52) U.S. Cl.
CPC .......... *H02H 1/0007* (2013.01); *H02H 3/023* (2013.01); *H02H 3/08* (2013.01)

(58) Field of Classification Search
CPC ..... G01R 31/52; G01R 31/40; G01R 19/2513
See application file for complete search history.

(56) References Cited

U.S. PATENT DOCUMENTS

| | | | |
|---|---|---|---|
| 2013/0241583 A1* | 9/2013 | Chen ................... | G01R 31/327 324/750.01 |
| 2016/0041222 A1* | 2/2016 | Handy .................. | G01R 35/00 324/750.3 |
| 2016/0193926 A1* | 7/2016 | Abraham .............. | B60W 20/50 180/65.285 |
| 2018/0182583 A1* | 6/2018 | Kato .................... | H03K 17/567 |
| 2020/0182946 A1* | 6/2020 | Morimoto ............. | H02H 1/003 |
| 2021/0057997 A1* | 2/2021 | Zhang .................... | H02M 1/08 |

FOREIGN PATENT DOCUMENTS

JP    2002-100990 A    4/2002

* cited by examiner

*Primary Examiner* — Jermele M Hollington
*Assistant Examiner* — Temilade S Rhodes-Vivour
(74) *Attorney, Agent, or Firm* — Oliff PLC (57) ABSTRACT

An output module includes a first connection terminal, a second connection terminal, a power supply terminal, a controller, an output device, and a first cutoff switch. The first connection terminal is connected to a high potential side terminal of an external load. The second connection terminal is connected to a low potential side terminal of the external load. The power supply terminal is provided with an external power supply from an external power source. The output device is configured to operate by receiving a power supply generated by or based on the external power supply and to output an analog voltage or an analog current of a value instructed by the controller toward the first connection terminal. The first cutoff switch is configured to be controlled by the controller to open and close a first path between the second connection terminal and a ground.

8 Claims, 6 Drawing Sheets

OUTPUT MODULE OF INDUSTRIAL CONTROL APPARATUS

CROSS REFERENCE TO RELATED APPLICATION

The present application is based on Japanese Patent Application No. 2020-193141 filed on Nov. 20, 2020, the disclosure of which is incorporated herein by reference.

TECHNICAL FIELD

The present disclosure relates to an output module of an industrial control apparatus that outputs an analog voltage or an analog current to an external load.

BACKGROUND

For example, a known industrial control apparatus such as a programmable logic controller includes (i) a CPU module for controlling an overall operation and (ii) an output module for outputting an analog voltage or an analog current to an external load based on a command from the CPU module. The programmable logic controller may be referred to as a PLC.

SUMMARY

According to an example of the present disclosure, an output module is provided to include a first connection terminal, a second connection terminal, a power supply terminal, a controller, an output device, and a first cutoff switch. The first connection terminal is connected to a high potential side terminal of an external load. The second connection terminal is connected to a low potential side terminal of the external load. The power supply terminal is provided with an external power supply from an external power source. The output device is configured to operate by receiving a power supply generated by or based on the external power supply and to output an analog voltage or an analog current of a value instructed by the controller toward the first connection terminal. The first cutoff switch is configured to be controlled by the controller to open and close a first path between the second connection terminal and a ground.

BRIEF DESCRIPTION OF DRAWINGS

The objects, features, and advantages of the present disclosure will become more apparent from the following detailed description made with reference to the accompanying drawings. In the drawings.

DETAILED DESCRIPTION

The following will describe embodiments of the present disclosure with reference to the accompanying drawings. In each embodiment, the substantially same components are denoted by the same reference signs and description thereof is omitted.

First Embodiment

A first embodiment is described with reference to FIG. 1 and FIG. 2.

Figure 1:
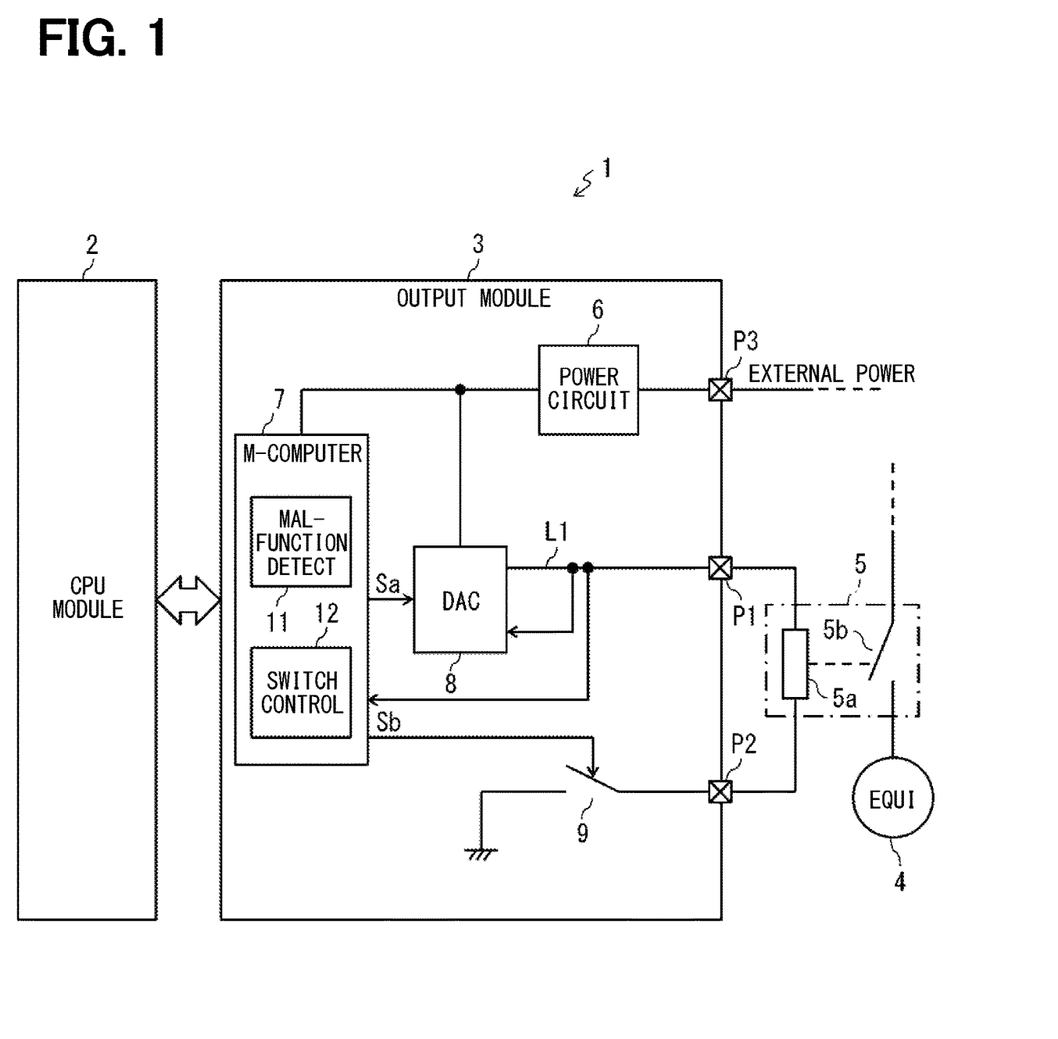
FIG. 1 is a diagram schematically showing a configuration of a programmable logic controller (PLC) according to a first embodiment.
Figure 2:
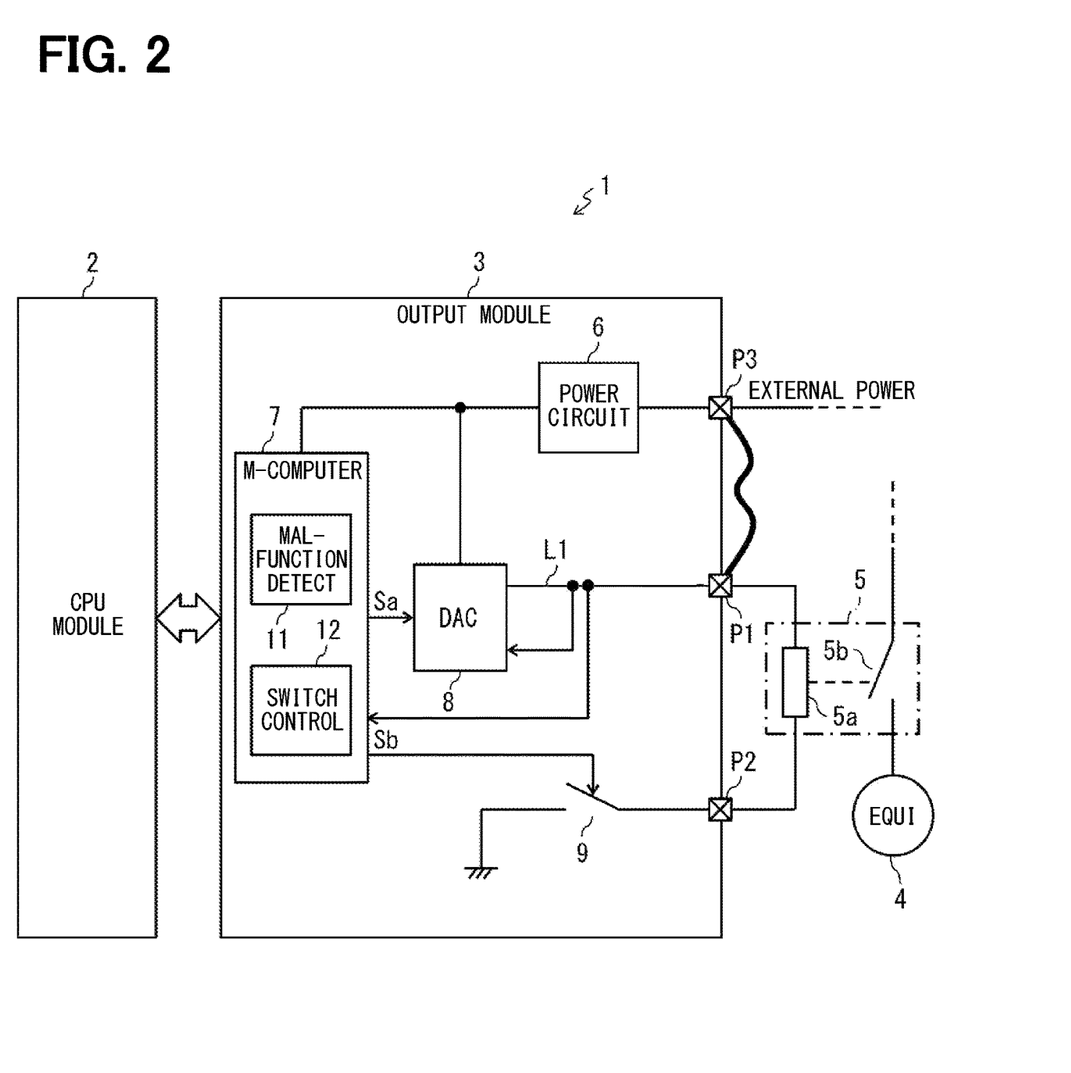
FIG. 2 is a diagram schematically showing a configuration of a PLC in a state where a power source short-circuit malfunction occurs according to the first embodiment.

As shown in FIG. 1, a programmable logic controller 1 corresponding to an industrial control apparatus includes (i) a CPU module 2 for controlling overall operations, (ii) an output module 3, and (iii) an input module (not shown). The programmable logic controller 1 may also be referred to as a PLC 1. The PLC 1 controls the operation of a solenoid valve 5 in the equipment 4 provided in, for example, a factory. Each module included in the PLC 1 including the CPU module 2 and the output module 3 is configured to be able to communicate with each other via a bus communication line.

The output module 3 includes (i) connection terminals P1 and P2 which are connected with a solenoid valve 5 as an external load, (ii) a power supply terminal P3 provided with an external power supply from an external power source having a voltage of +24V, (iii) a power supply circuit 6, (iv) a controller 7, (v) a digital-to-analog converter 8 (i.e., a DAC 8), and (v) a cutoff switch 9. The controller 7 and method described in the present disclosure may be implemented by one or more than one special-purpose computer. Such a computer may be created (i) by configuring (a) a memory and a processor programmed to execute one or more particular functions embodied in computer programs, or (ii) by configuring (b) a processor provided by one or more special purpose hardware logic circuits, or (iii) by configuring a combination of (a) a memory and a processor programmed to execute one or more particular functions embodied in computer programs and (b) a processor provided by one or more special purpose hardware logic circuits. The computer programs may be stored, as instructions being executed by a computer, in a tangible non-transitory computer-readable storage medium.

The output module 3 is an analog output module that outputs an analog voltage to the solenoid valve 5, which is an external load, based on a command given from the CPU module 2. The solenoid valve 5 includes (i) a coil 5a connected between the connection terminals P1 and P2 of the output module 3 and (ii) a valve 5b that is opened and closed according to the current flowing through the coil 5a. In this case, the connection terminal P1 functions as a first connection terminal connected to the high potential side terminal of the coil 5a of the solenoid valve 5 which is a load. The connection terminal P2 functions as a second connection terminal connected to the low potential side terminal of the coil 5a of the solenoid valve 5 which is a load.

The power supply circuit 6 receives an external power supply via the power supply terminal P3, and generates an internal power supply used in each configuration inside the output module 3 based on the external power supply. The internal power supply is generated by stepping down the external power supply; its voltage value is, for example, +5V.

In the present and subsequent embodiments, as examples, the controller may be provided as a microcomputer. In the first embodiment, the microcomputer 7 operates by receiving the internal power supply, and controls the overall operation of the output module 3. Based on the command given from the CPU module 2, the microcomputer 7 outputs a command signal Sa indicating an instruction value of the output voltage to the DAC 8. The microcomputer 7 has a function of monitoring whether or not a voltage as instructed is output from the DAC 8. Therefore, the microcomputer 7 monitors the voltage of the signal line L1 connecting between the output terminal of the DAC 8 and the connection terminal P1.

The DAC 8 is a voltage output type DAC that outputs an analog voltage. The DAC 8 operates by being provided with an internal power source, and outputs an analog voltage having a value instructed by the instruction signal Sa from the microcomputer 7 toward the connection terminal P1. In this case, the DAC 8 functions as an output device. The DAC 8 has a configuration in which the voltage of the signal line L1 is monitored, and the output voltage is feedback-controlled so that the value of the monitored voltage matches the value instructed by the microcomputer 7.

The cutoff switch 9 is a semiconductor switching element such as an FET, and is connected between the connection terminal P2 and the ground which is the reference potential of the circuit. The cutoff switch 9 is opened/closed based on the binary open/close signal Sb given by the microcomputer 7. Specifically, the cutoff switch 9 is opened, that is, turned off when the open/close signal Sb is at a level of commanding opening. Whereas, the cutoff switch 9 is closed, that is, turned on when the open/close signal Sb is at a level of commanding closing. In the present embodiment, the open/close signal Sb commands opening at the low level. Whereas, the open/close signal Sb commands closing at the high level. In this way, the cutoff switch 9 opens and closes a path between the connection terminal P2 and the ground, and functions as a first cutoff switch of which the opening and closing is controlled by the microcomputer 7.

The microcomputer 7 includes (i) a malfunction detector unit 11, which may also be referred to as a malfunction detector 11, and (ii) an open/close controller unit 12, which may also be referred to as a switcher unit 12 or a switcher 12. The malfunction detector unit 11 and the open/close controller unit 12 may be implemented in a hardware manner, or may also be implemented in a combination of software manner and hardware manner. For instance, in the present embodiment, the malfunction detector unit 11 and the open/close controller unit 12 are realized by a CPU of the microcomputer 7 executing a computer program stored in a ROM and executing the processing corresponding to the computer program. In other words, the malfunction detector unit 11 and the open/close controller unit 12 are realized by using software program along with the hardware circuitry.

The malfunction detector unit 11 detects a power source short-circuit malfunction, which is a malfunction in which the connection terminal P1 is short-circuited to a power source such as an external power source. Such a power source short-circuit malfunction occurs, for example, due to a wiring short circuit in which the connection terminal P1 and the power supply terminal P3 are short-circuited via wiring, as shown in FIG. 2. The malfunction detector unit 11 can detect a power source short-circuit malfunction as follows based on the voltage of the signal line L1 and the like. That is, the malfunction detector unit 11 can determine that a power source short-circuit malfunction has occurred when the voltage of the signal line L1 is higher than the output range of the DAC 8.

The open/close controller unit 12 controls the open/close of the cutoff switch 9 and generates the open/close signal Sb described above. The open/close controller unit 12 generates and outputs a high-level open/close signal Sb at a normal time when various malfunctions including a power source short-circuit malfunction have not occurred. That is, the open/close controller unit 12 normally controls the cutoff switch 9 to be closed. As a result, the cutoff switch 9 is normally closed. Further, the open/close controller unit 12 generates and outputs a low-level open/close signal Sb when the malfunction detector unit 11 detects a power source short-circuit malfunction. That is, the open/close controller unit 12 controls to open the cutoff switch 9 when a power source short-circuit malfunction is detected. As a result, the cutoff switch 9 is opened when the power source short-circuit malfunction is detected.

As described above, the output module 3 of the present embodiment includes a cutoff switch 9 that opens and closes a path between (I) the ground and (ii) the connection terminal P2, which is connected to the low potential side terminal of the coil 5a of the solenoid valve 5 as a load. The microcomputer 7 that controls the overall operation of the output module 3 includes (i) a malfunction detector unit 11 that can detect a power source short-circuit malfunction, and (ii) an open/close controller unit 12 that controls to open the cutoff switch 9 when a power source short-circuit malfunction is detected by the malfunction detector unit 11. According to such a configuration, when a power source short-circuit malfunction occurs due to a wiring short circuit or the like, such a power source short-circuit malfunction can be detected. Further, the energization of the coil 5a can be cut off when the malfunction is detected, thereby putting the output in a safe state.

Further, according to the configuration of the present embodiment, there are the following merits over the configuration of a known technique. That is, in the configuration of a known technique, the voltage of the terminal on the output side of the cutoff switch is monitored for the feedback control of the output. In this case, the value of the voltage actually applied to the load is lower than the value of the monitored voltage due to the influence of the on-resistance of the cutoff switch. Therefore, there is a possibility that the output cannot be controlled accurately. On the other hand, in the configuration of the present embodiment, the cutoff switch 9 does not intervene in the voltage monitoring path for output feedback control. Therefore, according to the configuration of the present embodiment, it is possible to accurately monitor the voltage applied to the solenoid valve 5 without being affected by the on-resistance of the cutoff switch 9. As a result, the output can be controlled with high accuracy.

Second Embodiment

Figure 3:
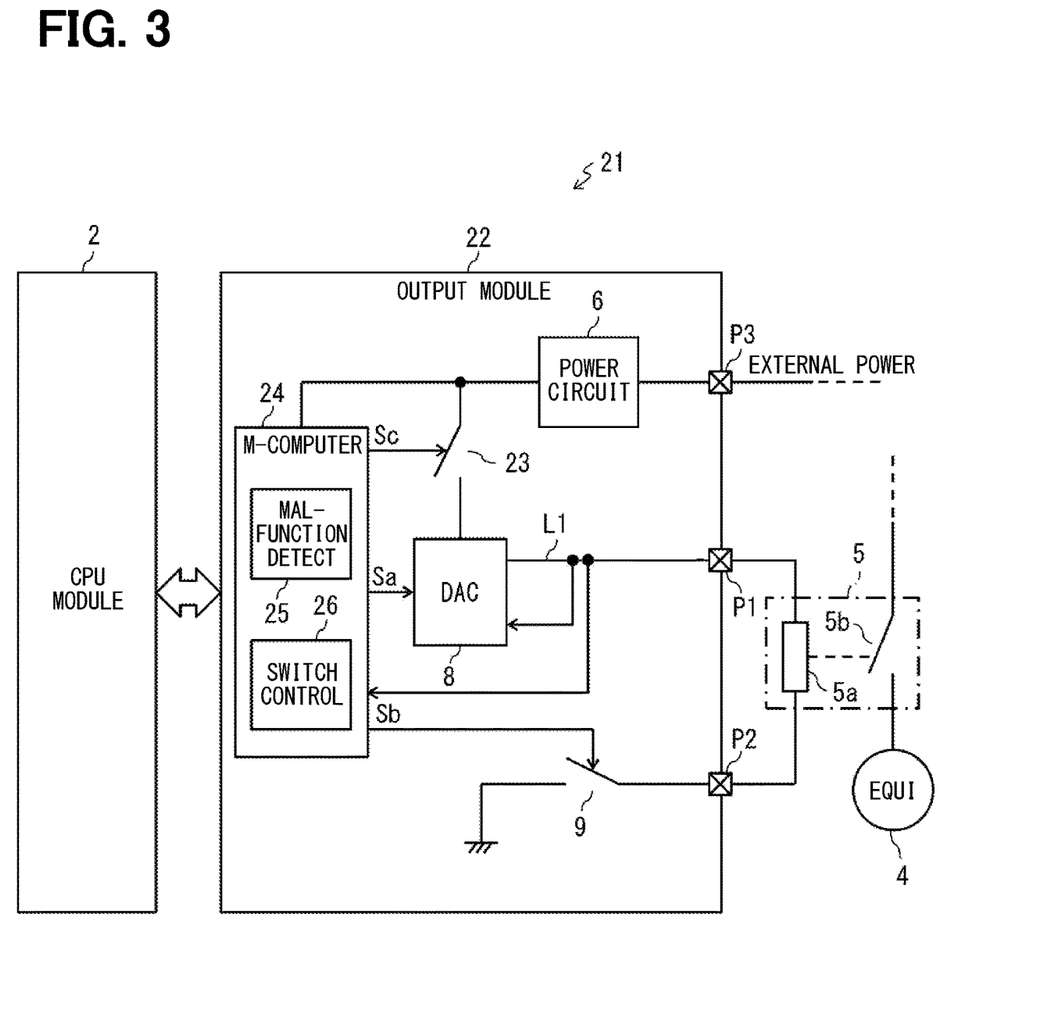
FIG. 3 is a diagram schematically showing a configuration of a PLC according to a second embodiment.

Hereinafter, a second embodiment will be described with reference to FIGS. 3 and 4. As shown in FIG. 3, the output module 22 of the PLC 21 of the present embodiment is different from the output module 3 of the first embodiment in that a cutoff switch 23 is added and a microcomputer 24 is provided instead of the microcomputer 7. The cutoff switch 23 is a semiconductor switching element such as an FET, and is interposed in series with the power supply path from the power supply circuit 6 to the DAC 8.

The cutoff switch 23 is opened/closed based on the binary open/close signal Sc given from the microcomputer 24. Specifically, the cutoff switch 23 is opened, that is, turned off when the open/close signal Sc is at a level that commands opening, and is closed, that is, turned on when the open/close signal Sc is at a level that commands closing. In the present embodiment, the open/close signal Sc commands the opening at the low level and the closing at the high level. In this way, the cutoff switch 23 functions as a second cutoff switch that opens and closes the power supply path to the DAC 8 and is controlled to open and close by the microcomputer 24.

Like the microcomputer 7, the microcomputer 24 functions as a controller, and includes a malfunction detector unit 25 and an open/close controller unit 26. As described above, the malfunction detector unit 25 and the open/close controller unit 26 can also be implemented in a hardware manner or in a combination of a software manner and a hardware manner, like the malfunction detector unit 11 and the open/close controller unit 12. The malfunction detector unit 25 has a function of detecting a ground short-circuit malfunction, which is a malfunction in which the connection terminal P2 is short-circuited to the ground, in addition to the same function as the malfunction detector unit 11.

Figure 4:
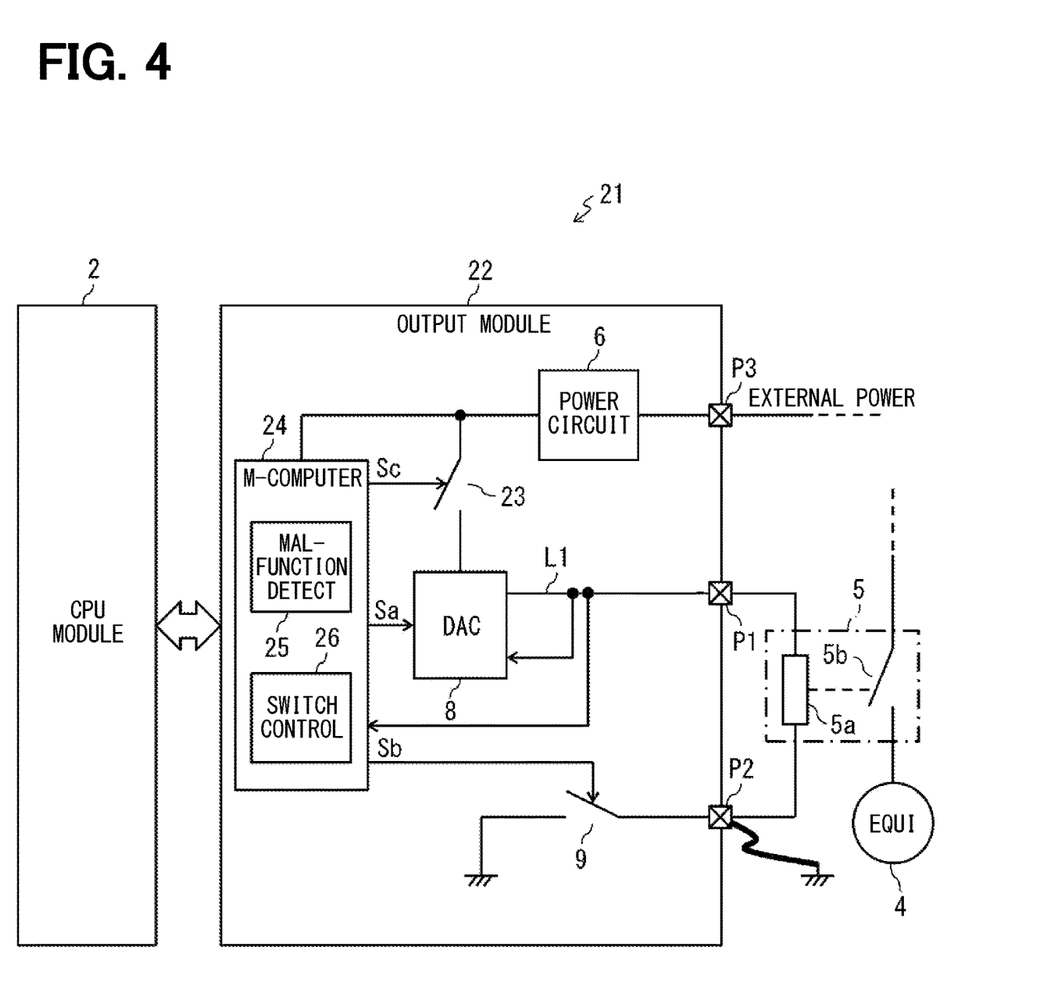
FIG. 4 is a diagram schematically showing a configuration of a PLC in a state where a ground short-circuit malfunction occurs according to the second embodiment.

Such a ground short-circuit malfunction occurs, for example, due to a wiring short circuit in which the connection terminal P2 and the ground are short-circuited via wiring, as shown in FIG. 4. In this case, the microcomputer 24 is configured to detect the current flowing through the signal line L1 of the DAC 8 in order to enable the detection of the ground short-circuit malfunction. The malfunction detector unit 25 can detect a ground short-circuit malfunction as follows based on the current flowing through the signal line L1 and the like. That is, the malfunction detector unit 25 determines that a ground short-circuit malfunction has occurred when it is confirmed that a current is flowing through the signal line L1 even though the cutoff switch 9 is controlled to be opened. The period of time for opening the cutoff switch 9 for detecting a ground short-circuit malfunction is a relatively short time within a range that does not affect normal operation.

The open/close controller unit 26 has a function of controlling the open/close of the cutoff switch 23 in addition to the same function as the open/close controller unit 12, and generates the open/close signal Sc described above. The open/close controller unit 26 generates and outputs a high-level open/close signal Sc during a normal time when various malfunctions including ground short-circuit malfunctions do not occur. That is, the open/close controller unit 26 normally controls the cutoff switch 23 to be closed. As a result, the cutoff switch 23 is normally closed. Further, when the malfunction detector unit 25 detects a ground short-circuit malfunction, the opening/closing controller unit 26 generates and outputs a low-level opening/closing signal Sc. That is, the open/close controller unit 26 controls to open the cutoff switch 23 when a ground short-circuit malfunction is detected. As a result, when a malfunction is detected in which a ground short-circuit malfunction is detected, the cutoff switch 23 is opened.

In the configuration of the first embodiment, suppose a case where a ground short-circuit malfunction, which is a malfunction in which the connection terminal P2 is short-circuited to the ground, occurs. In such a case, even if the cutoff switch 9 is turned off, the energization to the coil 5a of the solenoid valve 5 is not cut off, and a current may flow through the coil 5a. Therefore, the output module 22 of the present embodiment includes the cutoff switch 23 that opens and closes the power supply path to the DAC 8. The microcomputer 24 that controls the overall operation of the output module 22 includes (i) the malfunction detector unit 25 that can detect a ground short-circuit malfunction, and (ii) an open/close controller unit 26 that controls to open the cutoff switch 23 when a ground short-circuit malfunction is detected by the malfunction detector unit 25.

Such a configuration can provide the following operations. That is, when a ground short-circuit malfunction occurs due to a short circuit in the wiring, the ground short-circuit malfunction can be detected. Further, when the malfunction is detected, the cutoff switch 23 can be opened, so that the operation of the DAC 8 can be stopped. Further, the energization to the coil 5a can be cut off when the malfunction is detected, thereby putting the output in a safe state. In the configuration of the present embodiment, the cutoff switch 9 or the cutoff switch 23 does not intervene in the voltage monitoring path for output feedback control. Therefore, according to the configuration of the present embodiment, like the first embodiment, it is possible to accurately monitor the voltage applied to the solenoid valve 5 without being affected by the on-resistance of each of the cutoff switch 9 and the cutoff switch 23.

The malfunction detector unit 25 of the present embodiment has the same function as the malfunction detector unit 11 of the first embodiment. That is, the malfunction detector unit 25 can detect each of a power source short-circuit malfunction and a ground short-circuit malfunction. Further, the open/close controller unit 26 of the present embodiment has the same function as the open/close controller unit 12 of the first embodiment. That is, the open/close controller unit 26 controls to open the cutoff switch 9 when the malfunction detector unit 25 detects a power source short-circuit malfunction, and controls to open the cutoff switch 23 when the malfunction detector unit 25 detects a ground short-circuit malfunction. According to such a configuration and control of the present embodiment, regardless of whether a power source short-circuit malfunction or a ground short-circuit malfunction occurs, the malfunction can be detected and the output can be surely put into a safe state at the time of malfunction detection.

Third Embodiment

Figure 5:
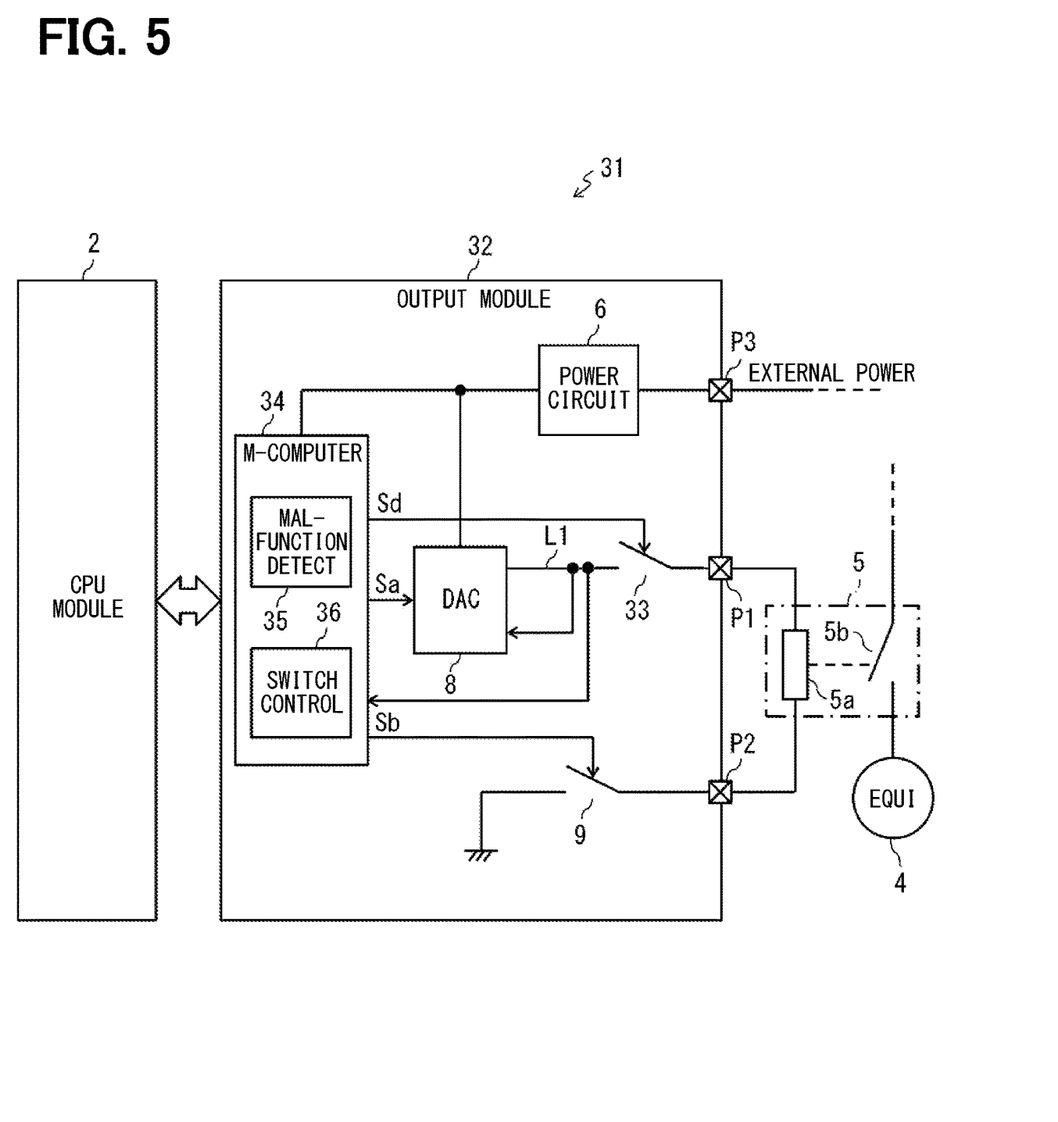
FIG. 5 is a diagram schematically showing a configuration of a PLC according to a third embodiment.

Hereinafter, a third embodiment will be described with reference to FIGS. 5 and 6. As shown in FIG. 5, the output module 32 of the PLC 31 of the present embodiment is different from the output module 3 of the first embodiment in that a cutoff switch 33 is added and a microcomputer 34 is provided in place of the microcomputer 7. The cutoff switch 33 is a semiconductor switching element such as an FET, and is interposed in series with a path from the output terminal of the DAC 8 to the connection terminal P1, that is, the signal line L1.

The cutoff switch 33 is opened/closed based on the binary open/close signal Sd given by the microcomputer 34. Specifically, the cutoff switch 33 is opened, that is, turned off when the open/close signal Sd is at a level that commands opening, and is closed, that is, turned on when the open/close signal Sd is at a level that commands closing. In the present embodiment, the open/close signal Sd commands the opening at the low level and the closing at the high level. In this way, the cutoff switch 33 opens and closes the path from the output terminal of the DAC 8 to the connection terminal P1 and functions as a third cutoff switch of which the opening and closing is controlled by the microcomputer 34.

Like the microcomputer 7, the microcomputer 34 functions as a controller, and includes a malfunction detector unit 35 and an open/close controller unit 36. As described above, the malfunction detector unit 35 and the open/close controller unit 36 may also be implemented in a hardware manner or in a combination of a software manner and a hardware manner, like the malfunction detector unit 11 and the open/close controller unit 12. The malfunction detector unit 35 has the same function as the malfunction detector unit 25 of the second embodiment, that is, a function of detecting a ground short-circuit malfunction, in addition to the same function as the malfunction detector unit 11.

Figure 6:
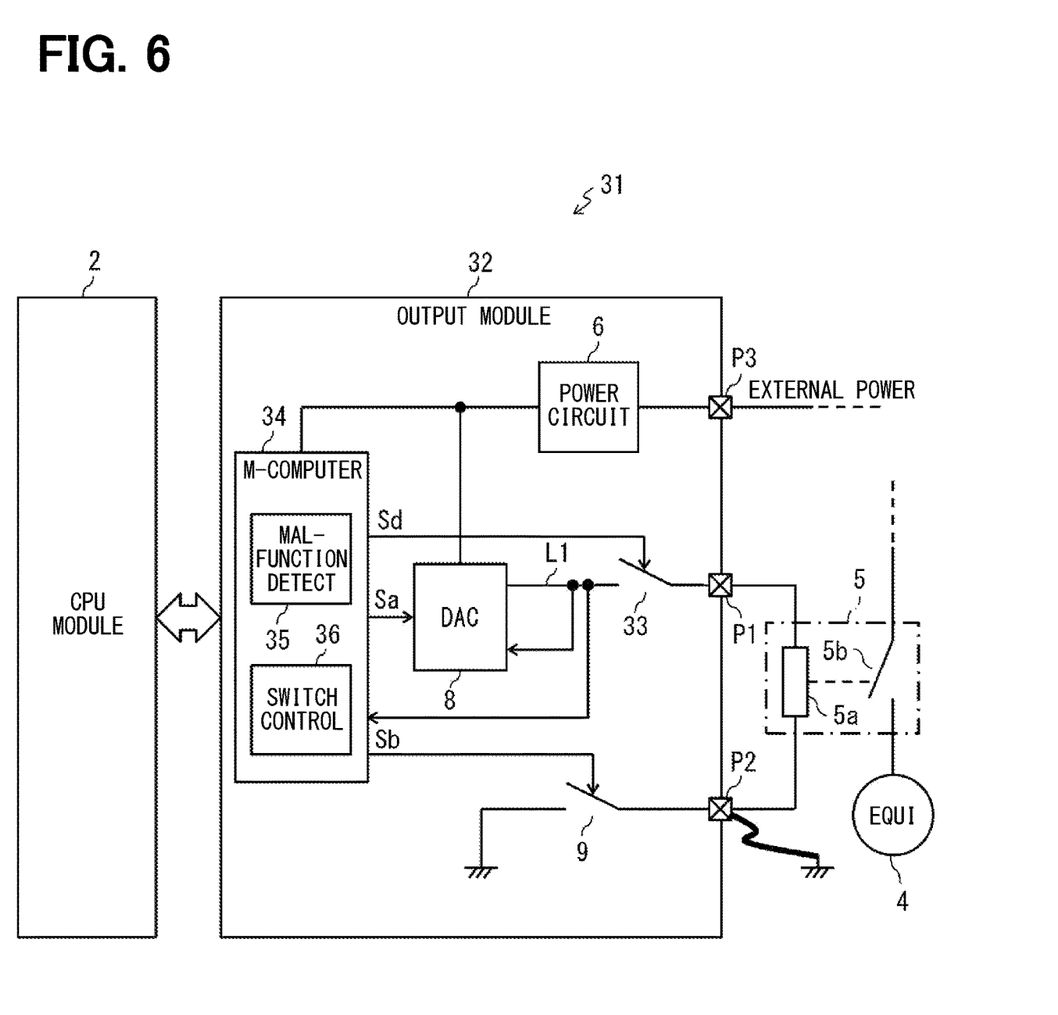
FIG. 6 is a diagram schematically showing a configuration of a PLC in a state where a ground short-circuit malfunction occurs according to the third embodiment.

Such a ground short-circuit malfunction occurs, for example, due to a wiring short circuit in which the connection terminal P2 and the ground are short-circuited via wiring, as shown in FIG. 6. In this case, the microcomputer 34 is configured to detect the current flowing through the signal line L1 of the DAC 8 in order to enable the detection of the ground short-circuit malfunction, like the microcomputer 24 according to the second embodiment. The malfunction detector unit 35 can detect a ground short-circuit malfunction as follows based on the current flowing through the signal line L1 and the like, like the malfunction detector unit 25 according to the second embodiment.

The open/close controller unit 36 has a function of controlling the open/close of the cutoff switch 33 in addition to the same function as the open/close controller unit 12, and generates the open/close signal Sd described above. The open/close controller unit 36 generates and outputs a high-level open/close signal Sd during a normal time when various malfunctions including ground short-circuit malfunctions do not occur. That is, the open/close controller unit 36 normally controls the cutoff switch 33 to be closed. As a result, the cutoff switch 33 is normally closed. Further, when the malfunction detector unit 35 detects a ground short-circuit malfunction, the opening/closing controller unit 36 generates and outputs a low-level opening/closing signal Sd. That is, the open/close controller unit 36 controls to open the cutoff switch 33 when a ground short-circuit malfunction is detected. As a result, when the ground short-circuit malfunction is detected, the cutoff switch 33 is opened.

As described above, the output module 32 of the present embodiment includes the cutoff switch 33 that opens and closes a path from the output terminal of the DAC 8 to the connection terminal P1. The microcomputer 34 that controls the overall operation of the output module 32 includes (i) the malfunction detector unit 35 that can detect a ground short-circuit malfunction, and (ii) an open/close controller unit 36 that controls to open the cutoff switch 33 when a ground short-circuit malfunction is detected by the malfunction detector unit 35. According to such a configuration, when a ground short-circuit malfunction occurs due to a wiring short circuit or the like, such a ground short-circuit malfunction can be detected. Further, the energization to the coil 5a can be cut off when a malfunction is detected, thereby putting the output in a safe state.

The malfunction detector unit 35 of the present embodiment has the same function as the malfunction detector unit 11 of the first embodiment. That is, the malfunction detector unit 35 can detect each of a power source short-circuit malfunction and a ground short-circuit malfunction. Further, the open/close controller unit 36 of the present embodiment has the same function as the open/close controller unit 12 of the first embodiment. That is, the open/close controller unit 36 controls to open the cutoff switch 9 when the malfunction detector unit 35 detects the power source short-circuit malfunction, and controls to open the cutoff switch 33 when the malfunction detector unit 35 detects the ground short-circuit malfunction. According to such a configuration and control according to the present embodiment, regardless of whether a power source short-circuit malfunction or a ground short-circuit malfunction occurs, the malfunction can be detected and the output can be surely put into a safe state at the time of malfunction detection.

OTHER EMBODIMENTS

The present disclosure is not limited to the embodiments that have been described above and illustrated in the drawings, but can freely be modified, combined, or expanded without departing from the gist of the present disclosure. The numerical values and the like shown in each of the above embodiments are merely examples, and the present disclosure is not limited thereto.

The present disclosure is applicable not only to the output module 3 of the PLC 1 that outputs an analog voltage to an external load, but also to output modules of industrial control apparatuses each of which outputs an analog voltage or an analog current to an external load. In an output module of an industrial control apparatus that outputs an analog current to an external load, a current output type DAC or the like that outputs an analog current can be adopted as the output device, instead of the voltage output type DAC 8.

For reference to further explain features of the present disclosure, the description is added as follows.

For example, a known industrial control apparatus such as a programmable logic controller includes (i) a CPU module for controlling an overall operation and (ii) an output module for outputting an analog voltage or an analog current to an external load based on a command from the CPU module. The programmable logic controller may be referred to as a PLC.

The analog output module of the PLC needs to self-diagnose and to put the output in a safe state when a malfunction is detected, so as to ensure a functional safety. There is a known technique provided with a cutoff switch to open and close between (i) a D/A converter that functions as an output device to output a voltage or current of a specified value and (ii) a connection terminal connected to the high potential side terminal of the load. The output is put into a safe state by turning off the cutoff switch when a malfunction is detected. The D/A converter, which is a digital-to-analog converter, may also referred to as a DAC.

However, in the above configuration, there may occur a power source short-circuit malfunction, in which the connection terminal is short-circuited to a power source such as an external power source due to a wiring short circuit. In such a case, even if the cutoff switch is turned off, the power supply to the load is not cut off and current flows through the load. That is, in the above configuration, when a power source short-circuit malfunction occurs, the load may not be turned off, that is, the output may not be in a safe state.

It is thus desired for the present disclosure to provide an output module of an industrial control apparatus that can put the output in a safe state when a malfunction in which a connection terminal connected to a load is short-circuited to a power source.

Aspects of the present disclosure described herein are set forth in the following clauses.

According to a first aspect of the present disclosure, an output module of the industrial control apparatus is provided to output an analog voltage or an analog current to an external load. The output module includes a first connection terminal, a second connection terminal, a power supply terminal, a controller, an output device, and a first cutoff switch. The first connection terminal is connected to a high potential side terminal of the external load. The second connection terminal is connected to a low potential side terminal of the external load. The power supply terminal is a terminal to which an external power supply from an external power source is provided. The output device is configured to operate by receiving a power supply generated by or based on the external power supply and to output an analog voltage or an analog current with a value commanded by the controller toward the first connection terminal. The first cutoff switch is configured to be controlled by the controller to open and close a first path between the second connection terminal and a ground.

In the above configuration according to the first aspect, the controller opens the first cutoff switch when a power source short-circuit malfunction occurs. This malfunction is in which the first connection terminal is short-circuited to a power source such as an external power source due to a wiring short circuit or the like. As a result, the power supply to the load can be cut off. Therefore, according to the above configuration, when a power source short-circuit malfunction occurs, the load can be turned off, that is, the output can be surely put into a safe state.

In the configuration according to the first aspect, when a ground short-circuit malfunction occurs, the power supply to the load may be not cut off and a current may flow through the load even if the first cutoff switch is opened. The ground short-circuit malfunction is a malfunction in which the second connection terminal is short-circuited to the ground due to a wiring short circuit or the like. According to a second aspect of the present disclosure, the output module of the industrial control apparatus according to the first aspect may further include a second cutoff switch controlled by the controller to open and close a second path of the power supply to the output device. According to such a configuration, even if a ground short-circuit malfunction occurs, the controller controls to open the second cutoff switch. As a result, the operation of the output device is stopped, so that the output of the voltage or current to the load can be cut off, that is, the output can be reliably put into a safe state.

Since the output device outputs a voltage or current with a value required by the controller, it is assumed to employ a configuration which feedback-controls the output. Further, it is assumed that a semiconductor switching element such as an FET is adopted as the first cutoff switch and the second cutoff switch. Based on these points, the above configuration according to the second embodiment has the following merits.

In a configuration of a typical technique, the voltage or current of the terminal on the output side of the cutoff switch is monitored for the feedback control of the output. In this configuration, the voltage or current value actually applied to the load becomes lower than the monitored voltage or current value due to the influence of the on-resistance of the cutoff switch. Therefore, there is a possibility that the output cannot be controlled accurately. On the other hand, in the above configuration according to the second aspect, neither the first cutoff switch nor the second cutoff switch is interposed in the voltage or current monitor path for output feedback control. Therefore, it is possible to accurately monitor the voltage or current applied to the load without being affected by the on-resistances of the first cutoff switch and the second cutoff switch. As a result, the output can be controlled with high accuracy.

According to a third aspect of the present disclosure, in the output module of the industrial control apparatus according to the second aspect, the controller includes a malfunction detector unit and a switcher unit. The malfunction detector unit is configured to detect short-circuit malfunctions of (i) a power source short-circuit malfunction in which the first connection terminal is short-circuited to a power source including the external power source and (ii) a ground short-circuit malfunction in which the second connection terminal is short-circuited to a ground. The switcher unit is configured to control to open and close the first cutoff switch and the second cutoff switch. The switcher unit is further configured to open the first cutoff switch in response to the malfunction detector unit detecting the power source short-circuit malfunction, and open the second cutoff switch in response to the malfunction detector unit detecting the ground short-circuit malfunction. According to such a configuration and control, regardless of whether a power source short-circuit malfunction or a ground short-circuit malfunction occurs, the malfunction can be detected and the output can be surely put into a safe state.

In the configuration according to the first aspect, when a ground short-circuit malfunction occurs, the power supply to the load may not be cut off and a current may flow through the load even if the first cutoff switch is opened. The ground short-circuit malfunction is a malfunction in which the second connection terminal is short-circuited to the ground due to a wiring short circuit or the like. According to a fourth aspect of the present disclosure, the output module of the industrial control apparatus according to the first aspect may further include a third cutoff switch controlled by the controller to open and close a third path from an output terminal of the output device to the first connection terminal. According to such a configuration, even if a ground short-circuit malfunction occurs, the controller controls to open the third cutoff switch to cut off the output of the voltage or current to the load, that is, to put the output into a safe state reliably.

According to a fifth aspect of the present disclosure, in the output module of the industrial control apparatus according to the fourth aspect, the controller further includes a malfunction detector unit and a switcher unit. The malfunction detector unit is configured to detect short-circuit malfunctions of (i) a power source short-circuit malfunction in which the first connection terminal is short-circuited to a power source including the external power source and (ii) a ground short-circuit malfunction in which the second connection terminal is short-circuited to a ground. The switcher unit is configured to control to open and close the first cutoff switch and the third cutoff switch. The switcher unit is further configured to open the first cutoff switch in response to the malfunction detector unit detecting the power source short-circuit malfunction, and open the third cutoff switch in response to the malfunction detector unit detecting the ground short-circuit malfunction. According to such a configuration and control, regardless of whether a power source short-circuit malfunction or a ground short-circuit malfunction occurs, the malfunction can be detected and the output can be surely put into a safe state.

What is claimed is:
1. An output module for an industrial control apparatus that outputs an analog voltage or an analog current to an external load, the output module comprising:
  a first connection terminal connected to a high potential side terminal of the external load;
  a second connection terminal connected to a low potential side terminal of the external load;
  a power supply terminal provided with an external power supply from an external power source;

an output device configured to operate by receiving a power supply generated by or based on the external power supply and to output the analog voltage or the analog current with an instructed value to the first connection terminal;

a first cutoff switch configured to open and close a first path between the second connection terminal and a ground;

a second cutoff switch configured to open and close a second path of the power supply to the output device; and a controller configured to provide the instructed value of the analog voltage or the analog current, the controller including:

a malfunction detector unit configured to detect short-circuit malfunctions of (i) a power source short-circuit malfunction in which the first connection terminal is short-circuited to a power source including the external power source and (ii) a ground short-circuit malfunction in which the second connection terminal is short-circuited to the ground; and a switcher unit configured to control opening and closing of the first cutoff switch and the second cutoff switch, the switcher unit being further configured to:

open the first cutoff switch in response to the malfunction detector unit detecting the power source short-circuit malfunction; and open the second cutoff switch in response to the malfunction detector unit detecting the ground short-circuit malfunction.

2. The output module according to claim 1, wherein:
the output device is a digital-to-analog converter.

3. An output module for an industrial control apparatus that outputs an analog voltage or an analog current to an external load, the output module comprising:

a first connection terminal connected to a high potential side terminal of the external load;

a second connection terminal connected to a low potential side terminal of the external load;

a power supply terminal provided with an external power supply from an external power source;

an output device configured to operate by receiving a power supply generated by or based on the external power supply and to output the analog voltage or the analog current with an instructed value to the first connection terminal;

a first cutoff switch configured to open and close a first path between the second connection terminal and a ground;

a second cutoff switch configured to open and close a second path of the power supply to the output device; and a controller configured to:

provide the instructed value of the analog voltage or the analog current;

detect short-circuit malfunctions of (i) a power source short-circuit malfunction in which the first connection terminal is short-circuited to a power source including the external power source and (ii) a ground short-circuit malfunction in which the second connection terminal is short-circuited to the ground;

open the first cutoff switch in response to detecting the power source short-circuit malfunction; and open the second cutoff switch in response to detecting the ground short-circuit malfunction.

4. The output module according to claim 3, wherein:
the output device is a digital-to-analog converter.

5. An output module for an industrial control apparatus that outputs an analog voltage or an analog current to an external load, the output module comprising:

a first connection terminal connected to a high potential side terminal of the external load;

a second connection terminal connected to a low potential side terminal of the external load;

a power supply terminal provided with an external power supply from an external power source;

an output device configured to operate by receiving a power supply generated by or based on the external power supply and to output an analog voltage or an analog current with an instructed value to the first connection terminal;

a first cutoff switch configured to open and close a first path between the second connection terminal and a ground;

a second cutoff switch configured to open and close a second path from an output terminal of the output device to the first connection terminal; and a controller configured to:

provide the instructed value of the analog voltage or the analog current;

detect short-circuit malfunctions of (i) a power source short-circuit malfunction in which the first connection terminal is short-circuited to a power source including the external power source and (ii) a ground short-circuit malfunction in which the second connection terminal is short-circuited to the ground;

open the first cutoff switch in response to detecting the power source short-circuit malfunction; and open the second cutoff switch in response to detecting the ground short-circuit malfunction.

6. The output module according to claim 5, wherein:
the output device is a digital-to-analog converter.

7. An output module for an industrial control apparatus that outputs an analog voltage or an analog current to an external load, the output module comprising:

a first connection terminal connected to a high potential side terminal of the external load;

a second connection terminal connected to a low potential side terminal of the external load;

a power supply terminal provided with an external power supply from an external power source;

an output device configured to operate by receiving a power supply generated by or based on the external power supply and to output an analog voltage or an analog current with an instructed value to the first connection terminal;

a first cutoff switch configured to open and close a first path between the second connection terminal and a ground; and a second cutoff switch configured to open and close a second path from an output terminal of the output device to the first connection terminal; and a controller configured to provide the instructed value of the analog voltage or the analog current, the controller including:

a malfunction detector unit configured to detect short-circuit malfunctions of (i) a power source short-circuit malfunction in which the first connection terminal is short-circuited to a power source including the external power source and (ii) a ground short-circuit malfunction in which the second connection terminal is short-circuited to the ground; and a switcher unit configured to control opening and closing of the first cutoff switch and the second cutoff switch, the switcher unit being further configured to:
  open the first cutoff switch in response to the malfunction detector unit detecting the power source short-circuit malfunction; and
  open the second cutoff switch in response to the malfunction detector unit detecting the ground short-circuit malfunction.

8. The output module according to claim 7, wherein:
the output device is a digital-to-analog converter.

\* \* \* \* \*